(12) United States Patent
Kester

(10) Patent No.: US 11,177,058 B2
(45) Date of Patent: Nov. 16, 2021

(54) COMPOSITE SURGE ARRESTER MODULE IN A DIE AND METHOD OF CONSTRUCTION

(71) Applicant: Jeffrey Joseph Kester, Bemus Point, NY (US)

(72) Inventor: Jeffrey Joseph Kester, Bemus Point, NY (US)

(73) Assignee: Jonathan Woodworth, Olean, NY (US)

( * ) Notice: Subject to any disclaimer, the term of this patent is extended or adjusted under 35 U.S.C. 154(b) by 264 days.

(21) Appl. No.: 16/117,015

(22) Filed: Aug. 30, 2018

(65) Prior Publication Data

US 2019/0066888 A1    Feb. 28, 2019

Related U.S. Application Data

(60) Provisional application No. 62/552,104, filed on Aug. 30, 2017.

(51) Int. Cl.
    *H01C 7/12*       (2006.01)
    *H02H 9/04*       (2006.01)
    *H01C 7/108*      (2006.01)

(52) U.S. Cl.
    CPC ............ *H01C 7/12* (2013.01); *H02H 9/041* (2013.01); *H01C 7/108* (2013.01)

(58) Field of Classification Search
    CPC ........... H01C 7/12; H01C 7/108; H02H 9/041
    See application file for complete search history.

(56) References Cited

U.S. PATENT DOCUMENTS

| 4,656,555 | A   |   | 4/1987  | Raudabaugh |                    |
|-----------|-----|---|---------|------------|--------------------|
| 4,734,823 | A   | * | 3/1988  | Cunningham | ......... H01C 7/126 |
|           |     |   |         |            | 361/117            |
| 4,899,248 | A   |   | 2/1990  | Raudabaugh |                    |
| 5,517,382 | A   |   | 5/1996  | Leupp et al. |                  |
| 5,625,523 | A   |   | 4/1997  | Nedriga    |                    |
| 5,712,757 | A   | * | 1/1998  | Bennett    | .................. H01C 7/126 |
|           |     |   |         |            | 361/118            |
| 6,483,685 | B1  | * | 11/2002 | Ramarge    | .................. H01C 7/12 |
|           |     |   |         |            | 361/117            |

(Continued)

*Primary Examiner* — Nguyen Tran
*Assistant Examiner* — Trinh Q Dang
(74) *Attorney, Agent, or Firm* — Vincent G. LoTempio

(57) ABSTRACT

A composite surge arrester assembly and method of construction protects electrical devices from voltage spikes by limiting the voltage supplied to an electric device by shorting to ground any unwanted voltages above a safe threshold. The composite surge arrester assembly forms an arrester array from an alternating arrangement of deformable conductive contact plates, and metal oxide varistor (MOV) blocks. The contact plates bend and have various types of surfaces to create uniform contact with MOV blocks. The MOV blocks are dimensioned to minimize metal mass. An epoxy impregnated fiberglass reinforcement member wraps around the arrester array at an angle between 0° to 90°, and preferably 45°, relative to the axial disposition of arrester array, while also purging air pockets therebetween. The reinforcement member dampens acoustic shock waves from high current impulses while maintaining electrical contact between MOV blocks. A polymer housing encapsulates the epoxy and fiberglass reinforced arrester array.

15 Claims, 16 Drawing Sheets

(56) References Cited

U.S. PATENT DOCUMENTS

| | | | | |
|---|---|---|---|---|
| 6,735,068 B1* | 5/2004 | Hartman | ................ | H01C 7/126 |
| | | | | 361/117 |
| 8,117,739 B2 | 2/2012 | Ramarge et al. | | |
| 9,225,165 B2 | 12/2015 | Pippert et al. | | |
| 2007/0025044 A1* | 2/2007 | Golubovic | ............. | H02H 9/042 |
| | | | | 361/124 |
| 2010/0053837 A1* | 3/2010 | Johansson | ................ | H01C 7/12 |
| | | | | 361/126 |
| 2010/0276160 A1* | 11/2010 | Tolman | ................... | E21B 43/14 |
| | | | | 166/386 |

* cited by examiner

--PRIOR ART--

--PRIOR ART--

--PRIOR ART--

COMPOSITE SURGE ARRESTER MODULE IN A DIE AND METHOD OF CONSTRUCTION

CROSS REFERENCE OF RELATED APPLICATIONS

This application claims the benefits of U.S. provisional application No. 62/552,104 filed Aug. 30, 2017 and entitled Polymer Housed Composite Surge Arrester Module and Construction Methods, which provisional application is incorporated by reference herein in its entirety.

FIELD OF THE INVENTION

The present invention relates generally to a composite surge arrester assembly and method of construction. More so, the present invention relates to an arrester array that utilizes an alternating arrangement of deformable conductive contact plates, and metal oxide varistor (MOV) blocks; and further, an epoxy impregnated fiberglass reinforcement member positioned around the arrester array at an angle relative to the axial disposition of the arrester array, such that air channels are purged from between the arrester array and the reinforcement member, and such that the reinforcement member helps to dampen acoustic shock waves resulting from high current impulses; and further a polymer housing encasing the fiberglass and epoxy enforced arrester array.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, a surge arrester is a protective device that is commonly connected in parallel with a comparatively expensive piece of electrical equipment so as to shunt or divert over voltage induced current surges safely around the equipment, thereby protecting the equipment and its internal circuitry from damage.

When exposed to an over-voltage condition, the surge arrester operates in a low impedance mode that provides a current path to electrical ground having a relatively low impedance. The surge arrester otherwise operates in a high impedance mode that provides a current path to ground having a relatively high impedance. The impedance of the current path is substantially lower than the impedance of the equipment being protected by the surge arrester when the surge arrester is operating in the low-impedance mode and is otherwise substantially higher than the impedance of the protected equipment.

Upon completion of the over-voltage condition, the surge arrester returns to operation in the high impedance mode. This prevents normal current at the system frequency from following the surge current to ground along the current path through the surge arrester. For example, in electrical distribution systems, surge arresters are deployed to protect distribution systems components such as transformers, capacitors, switches, cutouts, reclosers, breakers, and other voltage sensitive equipment from overvoltage surges due to lightning and other system fault conditions causing over voltages.

In another example, transmission and distribution lines are protected from lightning induced insulator flash over by line arresters mounted in parallel configurations with line insulators; these arresters can be either directly connected between line and ground or may be connected using external series gap assemblies. Due to the nonlinear resistance of the Metal Oxide Varistors (MOV) surge arresters, voltage is clamped to levels protected equipment can withstand while energies are shunted through the surge arrester to ground.

Another type of arrester is applied for substation protection. These arresters are primarily exposed to slower wave front and longer duration over voltages do to stored charge after switching events as well as other system related events. Being applied in shielded areas, they generally are not subjected to high current lightning duty and the associated thermal shock effects but can benefit from some aspects of the module construction described in this invention.

It is known that prior surge arrester arrays utilized porcelain housed surge arresters. This type was problematic due to dimensional control issues leading to seal failures. Porcelain housed MOV arresters contained significant volumes of air surrounding the MOV blocks. Moisture ingress into the porcelain housed arresters would lower dielectric strength within the arrester housing leading to failure. Due to the nature of porcelain, failure modes could produce high levels of demonstration due to fragmentation of the housing and MOV blocks. These fragments could cause damage to adjacent equipment and personnel.

Polymer housed composite surge arrester designs prevalent on the market today typically have solid and connected interfaces between the active MOV block and conductive spacer core and connection terminals, a structural composite backbone, and a polymer housing sealing the active structure from the operating environment. Polymer housed composite arrester design concepts have evolved to become the preferred construction type as they have proven to be reliable and cost effective while providing non-fragmenting failure modes which reduce the risk of damage to adjacent protected equipment and provide improved safety to nearby personnel.

Generally, polymer housed composite surge arrester designs include an elongated outer enclosure or housing made of an electrically insulating polymer material, a composite mechanical structure containing a pair of electrical terminals at opposite ends of the enclosure for connecting the arrester between a line-potential conductor and electrical ground, and an array of other electrical components that form a series electrical path between the terminals. These components typically include a stack of voltage-dependent, nonlinear resistive elements, referred to as metal oxide varistors (MOV block or varistor).

Often, an MOV block is characterized by having a relatively high resistance when exposed to a normal operating voltage, and a much lower resistance when exposed to a larger voltage, such as is associated with over-voltage conditions. The number of MOV blocks in a stack, and or the length of MOV blocks is varied as required to maintain a high impedance state to support various system voltages and grounding conditions found on medium voltage distribution systems as well as transmission lines of all voltage classes.

In addition to MOV blocks, a surge arrester assembly also may include one or more spark gap assemblies housed within the electrical module assembly and electrically connected in series with the MOV blocks. Some arresters also include electrically-conductive solid metal spacer elements coaxially aligned with the MOV blocks and impedance graded spark gap assemblies. For proper arrester operation, contact must be maintained between the components of the stack. To accomplish this, it is known to apply an axial load to the elements of the stack.

It is recognized that good axial contact is important to ensure a relatively low contact resistance between the adjacent faces of the elements to ensure a relatively uniform current distribution through the elements, and to provide good heat transfer between the elements and the end terminals. One way to apply this load is to employ springs within the housing to urge the stacked elements into engagement with one another. Another way to apply the load is to wrap the stack of arrester elements with composite epoxy and glass fibers so as to axially-compress the elements within the stack. Yet another way is to incorporate a jack screw device within the end terminals to tension composite epoxy and glass fibers thus compressing the array of active and conductive elements.

The primary duty of medium voltage arresters is protection from lightning impulses. Industry standards require minimum product performance capability based on 4/10 current impulses where 4 represents 4 microseconds to 90% of crest current and 10 represents an additional time of 10 microseconds for current to fall to ½ of crest current. Standard test currents range from 40 kA to 100 kA depending on the product design class.

It is known to those skilled in the art, that immediately following high current lightning impulses, an acoustical shock wave due to thermal-mechanical stress occurs within the MOV blocks of the arrester module. The mechanical stress starts to occur towards the tail of the current impulse and crests after the impulse. The mechanical stress is both cyclic and decaying. The peak magnitude and cyclic frequency is dependent on current density as well as block thickness. At a given peak current density and with increasing block thickness, the peak shock magnitude rises, the cyclic frequency decreases, while the total decay rate increases.

Based on the material strength of the MOV, the impulse current density relative to the MOV block cross-sectional area, and the thickness to diameter aspect ratio; these stresses become the limiting case to define minimum MOV block size within an arrester applied for protection from lightning related overvoltages. The optimum ratio of block thickness to height ratio is believed to be approximately 0.9/1 and within a range of 1.1/1 and 0.6/1, the lower limit being constrained by propensity to flashover when opposing MOV Block contact faces become too close together.

Most conventional MOV surge arrester assemblies incorporate electrical module assemblies containing blocks stacked in an array including other components such as terminals, conductive contact plates and conductive solid metal spacers, and in some cases, impedance graded spark gap assemblies. All said components in axial compression so as to maintain adequate electrical contact. When compressed MOV blocks are stacked together oriented in end to end arrays, said stack becomes a monolithic stack, effectively becoming a single tall MOV block, resulting in even larger increases to the thermal-mechanical force following high current impulse, thus in effect further reducing lightning current impulse capacity due to the effectively increased thickness to diameter ratio. Therefore, MOV electrical module assemblies with higher system voltage ratings have reduced lightning current capacity.

In effort to improve High Current Impulse durability and to make medium voltage polymer housed composite surge arresters more compact, others have disclosed compliant joint structures which act to reduce the magnitude of thermal-mechanical force by dampening the acoustic shockwaves resulting from high current impulses through the MOV blocks.

However, known solutions have not been utilized commercially as the technologically has proven difficult to produce and or cost prohibitive as the previously disclosed joint structure must be adequately high in conductivity, preferably packaged with adhesives, or alternatively combined with elastomers or other low shear modulus materials to create the contact between pairs of MOV block contact faces.

Other proposals have involved surge arresters and methods for countering voltage spikes. The problem with these surge arresters is that they do not reduce the mass by reducing metal content. Also, they do not dampen acoustics from voltage surges through use of an epoxy impregnated fiberglass reinforcement member positioned around the array at angles between 0°-90°. Even though the above cited surge arresters meets some of the needs of the market, a composite surge arrester assembly and method of construction that utilizes an alternating arrangement of deformable conductive contact plates, and metal oxide varistor blocks; and further, an epoxy impregnated fiberglass reinforcement member positioned around the arrester array at an angle relative to the axial disposition of the arrester array, such that air channels are purged from between the arrester array and the reinforcement member, and such that the reinforcement member helps to dampen acoustic shock waves resulting from high current impulses; and further a polymer housing encasing the fiberglass and epoxy enforced arrester array, is still desired.

SUMMARY

Illustrative embodiments of the disclosure are generally directed to a composite surge arrester assembly and method of construction. The surge arrester assembly serves to protect electrical devices from voltage spikes through limiting the voltage stress across the protected equipment by providing a low impedance path and shunting the surge current around the equipment to ground.

In some embodiments, the surge arrester assembly comprises an arrester array having an alternating arrangement of deformable conductive contact plates, and metal oxide varistor (MOV) blocks. The deformable conductive contact plates may include deformable nesting contact spacers defined by two spaced-apart metal plates, or a single formed spacer having contact plates on opposing ends.

In some embodiments, an epoxy impregnated fiberglass reinforcement member is placed, drawn, or wrapped around the arrester array at an angle relative to the axial disposition of the arrester array—between 0° to 90°; preferably between 30° to 60°; and most preferably 45×45°. While being positioned around the arrester array, air channels are purged from between the arrester array and reinforcement member. The epoxy impregnated fiberglass reinforcement member helps to dampen acoustic shock waves resulting from high current impulses.

A polymer housing encases the fiberglass and epoxy enforced arrester array. An adhesive or a coupling agent may be used to help bond the polymer housing to the fiberglass and epoxy reinforced arrester array.

In another aspect, the epoxy impregnated fiberglass reinforcement member wraps around the arrester array in a spiraling or back and forth or placed or drawn configuration.

In another aspect, the epoxy impregnated fiberglass reinforcement is positioned as groups of bundles or in a pre-oriented fabric along or around the arrester array.

In another aspect, the angle of the spiraling epoxy reinforcing structure in relation to the axial disposition of the arrester array is about 45 degrees.

In another aspect, the composite housing includes at least one of the following: a relaxable insulating polymer, a fiberglass epoxy composite, a fiber glass epoxy combined with a polymer, and a polymer encasement.

In another aspect, the deformable conductive contact plates comprise several conformable metallic contact plates having a separation distance of approximately at least 3/8 inches, and wherein the contact plates are operatively arranged to provide low impedance electrical contact with an applied force between 50-1200 pounds.

In another aspect, the surge arrester assembly further comprises at least one composite rod extending between the terminal plates.

In another aspect, an insulating polymer material is disposed between the composite rod and the metal oxide varistor blocks.

In another aspect, the terminal electrodes comprise embossments.

In another aspect, a hoop is arranged on the embossments.

In another aspect, the hoop comprises a concentric composite hoop or an off axis composite hoop.

In another aspect, the surge arrester assembly further comprises an insulating polymer material that is disposed between the hoops and the embossment.

In another aspect, a relaxable polymer material is incorporated between embossments having a smaller radius than a bearing ends of hoops so as to fill the gap between the hoops and embossments with the insulating polymer material.

In another aspect, the metal oxide varistor blocks are defined by a thickness to diameter ratio between 0.6 and 1.1.

In another aspect, the metal oxide varistor blocks are operatively arranged at an applied force greater than 200 pounds.

In another aspect, the metal oxide varistor blocks are operatively arranged at an applied force between 50-1200 pounds.

In another aspect, the deformable conductive contact plates are defined by a height of at least 20 percent of a height of a metal oxide varistor block.

One objective of the present invention is to provide a composite surge arrester assembly that protects electrical devices from voltage spikes by limiting the voltage supplied to an electric device by shorting to ground excess surge current Another objective is to dampen acoustic shock waves resulting from high current impulses.

Yet another objective is to purge air channels between the epoxy reinforced arrester array and the epoxy impregnated fiberglass reinforcement member.

Yet another objective is to reduce the mass of MOV block and conduction path components.

Yet another objective is to reduce metal mass within the spaced volume by more than 50%.

Yet another objective is to maintain optimum MOV block thickness to height ratios.

Yet another objective is to reduce the diameter and mass of MOV blocks as well as volume of conductive metal spacer material, and insulating composite structural material, and insulating polymer housing material required per unit voltage rating of the completed medium voltage polymer housed composite arrester.

Yet another objective is to provide a surge arrester assembly that is conformable to provide low impedance electrical contact with an applied force between 200-1200 pounds.

Yet another objective is to push the arrester array through a clearance fit curing die, such that excess resin displaces entrapped air and capillaries to create a hermetically sealed composite structure.

Yet another objective is to deflect rods near the center of the array with a relaxed polymer, so as to create a relaxable feature.

Yet another objective is to provide deformable conductive contact plates having radial groves deflect to create uniform contact points and act to restrict epoxy resin bleed from the epoxy composite.

Yet another objective is to provide deformable conductive contact plate surfaces that include: convex shapes, spoked ridges, spoked and radial ridges, largely smooth contact surfaces, and completely smooth contact surfaces.

Yet another objective is to deform the contact plates to make uniform contact when compression forces in the range of 200-1200 pounds are applied on the array of MOV blocks, terminals plates, and deformable contact plates.

Yet another objective is to dilate the polymer housing by at least approximately 10% in diameter as this interference fit in combination with a weak bond created between the arrester array and the reinforcement member are created due to the adhesive, i.e., silane treated room temperature vulcanizing silicone (rtv) coating.

Yet another objective is to provide lighter weight and lower cost products of improved reliability consistent through all applied distribution system voltage classes.

Yet another objective is to provide an inexpensive to manufacture surge arrester assembly.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which:

FIG. 17A shows a standard process, and FIG. 17B shows an alternative process, in accordance with an embodiment of the present invention;

Like reference numerals refer to like parts throughout the various views of the drawings.

DETAILED DESCRIPTION OF THE INVENTION

Figure 1:
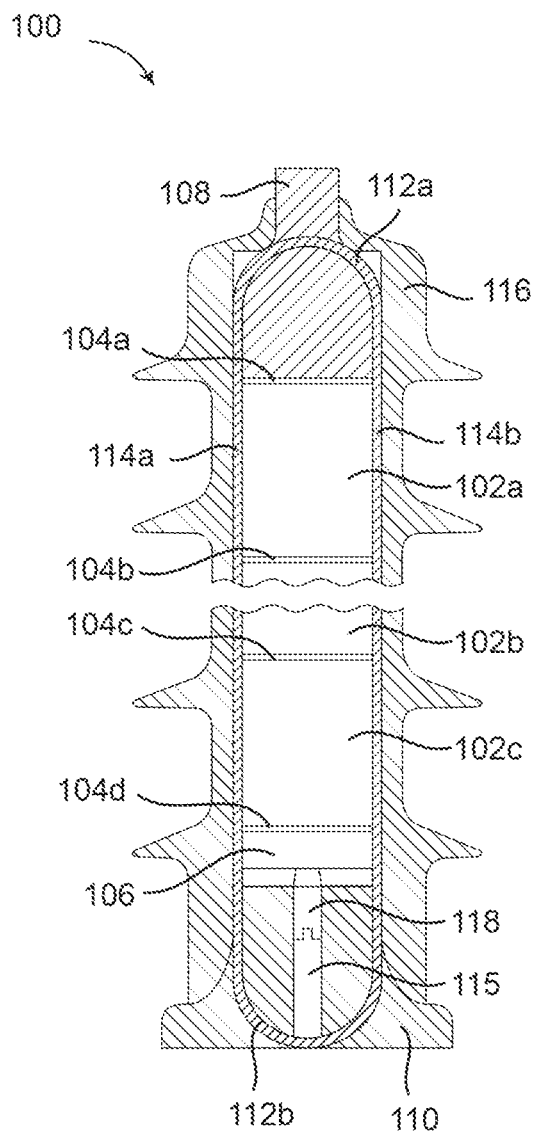
FIG. 1 illustrates a cross-sectional view of a prior art composite hoop type polymer housed composite arrester module used in the power system industry.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A composite surge arrester module 500 and method 1900 of construction is referenced in FIGS. 1-19B. The composite surge arrester module 500 is configured to help protect electrical devices from voltage spikes by limiting the voltage supplied to an electric device by shorting to ground any unwanted voltages above a safe threshold. The composite surge arrester module 500 forms an arrester array 502 from an alternating arrangement of deformable conductive contact plates 504a-b, and metal oxide varistor (MOV) blocks 506a-c. Conductive contact plates 504a-b are configured to deform, bend, and have various types of surfaces to create uniform contact with the MOV blocks 506a-c. MOV blocks 506a-c are sized and shaped to minimize metal mass. An epoxy impregnated fiberglass reinforcement member 508 wraps around arrester array 502 at an angle relative to the axial disposition of the arrester array, purging air and excess epoxy in the process. This is promoted in the die curing processes. Most manufacturers cure in air without any compression on the surface which can result in air entrapment. The deformable contact plates are used to create a separation between the MOV blocks. Provided that the separation space is large enough, the composite reinforcement structure is relaxable enough to provide temporarily deflect and diffuse the acoustic shock wave associated with the high current impulse typical of lightning strikes. Depending on the composite structure type, sometimes insulating polymer materials contribute to this deflection. The composite structure as used with prior art technologies was configured to contain the arrester array and maintain adequate contact pressure for good electrical contact, within this invention the structure is optimized to also create a temporary relaxable feature that acts to diffuse current impulse related acoustic shock waves.

A polymer housing 1400 bonds to and encapsulates epoxy and fiberglass reinforced arrester array 502. An adhesive 510, such as silane treated room temperature vulcanizing silicone (rtv), helps bond housing 1400 to epoxy and fiberglass reinforced arrester array 502. In the case of direct molded polymer arresters which are maybe more preferred, a silane solution is applied to the composite module. Then, the module is preheated and placed into a die cavity within a rubber molding press where rubber is injected and bonds due to the silane coupling agent (for silicon rubber polymer housings. Adhesives are used as the couplant in the case of EPDM, TPR, or Thermal Plastic molded polymer housings). Alternatively, dielectric greases such as silicone grease can be used in designs employing a live interface construction which is common with some EPDM polymer housed arresters.

It is initially instructive to look at the various types of prior art surge arresters, before proceeding to describe the improvements made by module 500. Turning to the Figures, a prior composite arrester module commonly used in medium voltage polymer housed composite arresters today is depicted in FIGS. 1-4. As depicted, prior art composite arrester modules commonly use contact plates or spring washers to maintain contact between MOV blocks. If spacing is required to meet physical height requirements, solid blocks of aluminum are utilized. The top and bottom terminals are fashioned to contain axial compression using some form of fiberglass epoxy composite structure.

FIG. 1 references a conventional polymer housed composite surge arrester using hoop construction 100. MOV blocks 102a, 102b, 102c having contact plates 104a, 104b, 104c, 104d between and conductive spacer 106 on one end are contained between end terminals 108 and 110. End terminals 108 and 110 contain embossments 112 about 180° apart on each end terminal. Composite hoops are arranged on each pair of embossments 112. End terminal 108, 110 contains threaded bore 114 in which treaded tensioning stud 4 is located. Tensioning stud 118 is screwed into threaded bore 114 against spacer 106 placing all contained components 102a-c, 106, 104a-d in compression and in electrical contact with end terminals 108 and 110 which is all contained in polymer housing 116 creating an arrester subassembly.

Figure 2:
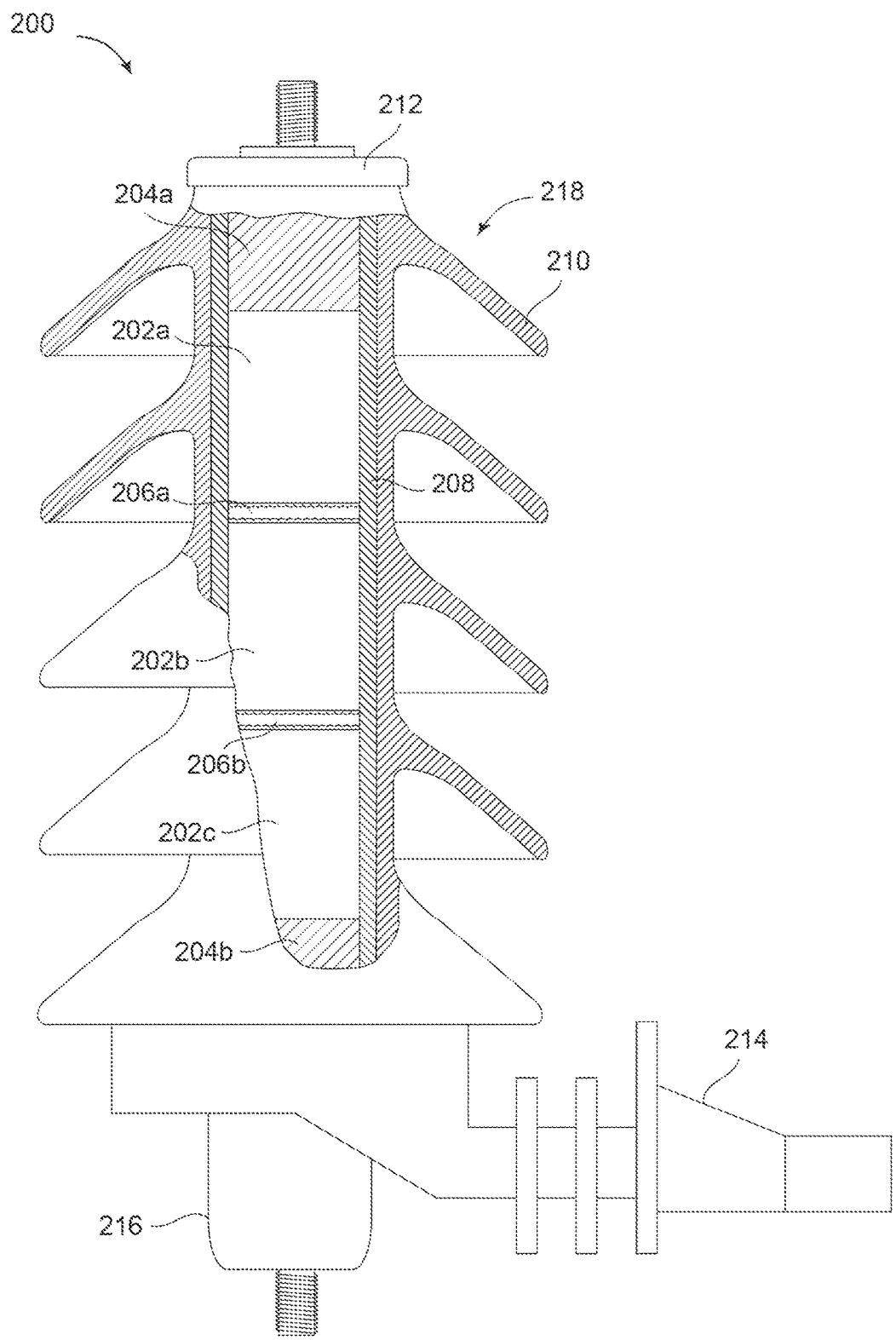
FIG. 2 illustrates a cut away view of a prior art composite wrap type polymer composite arrester assembly used in the power system industry.

FIG. 2 shows another conventional complete polymer housed composite surge arrester assembly 200 using a composite wrap construction. MOV Blocks 202a, 202b, 202c are placed between end terminals 204a, 204b with contact plates 206a, 206b between them. The array of 202a-c, 204a-b, and 206a-b are placed, drawn, or wrapped in an epoxy impregnated biaxial fiber glass fabric 208. While not discernable, epoxy impregnated biaxial fiber glass fabric 208 is temporarily wrapped in a heat shrinkable film and cured, said shrinkable film is removed and said composite wrapped module is coated with silane treated room temperature vulcanizing silicone (RTV), allowed to partially cure, inserted and contained in polymer housing 210 which is assembled between top cap assemblies 212 and insulating bracket 214 with ground lead disconnector 216 to form arrester assembly 218.

Figure 3:
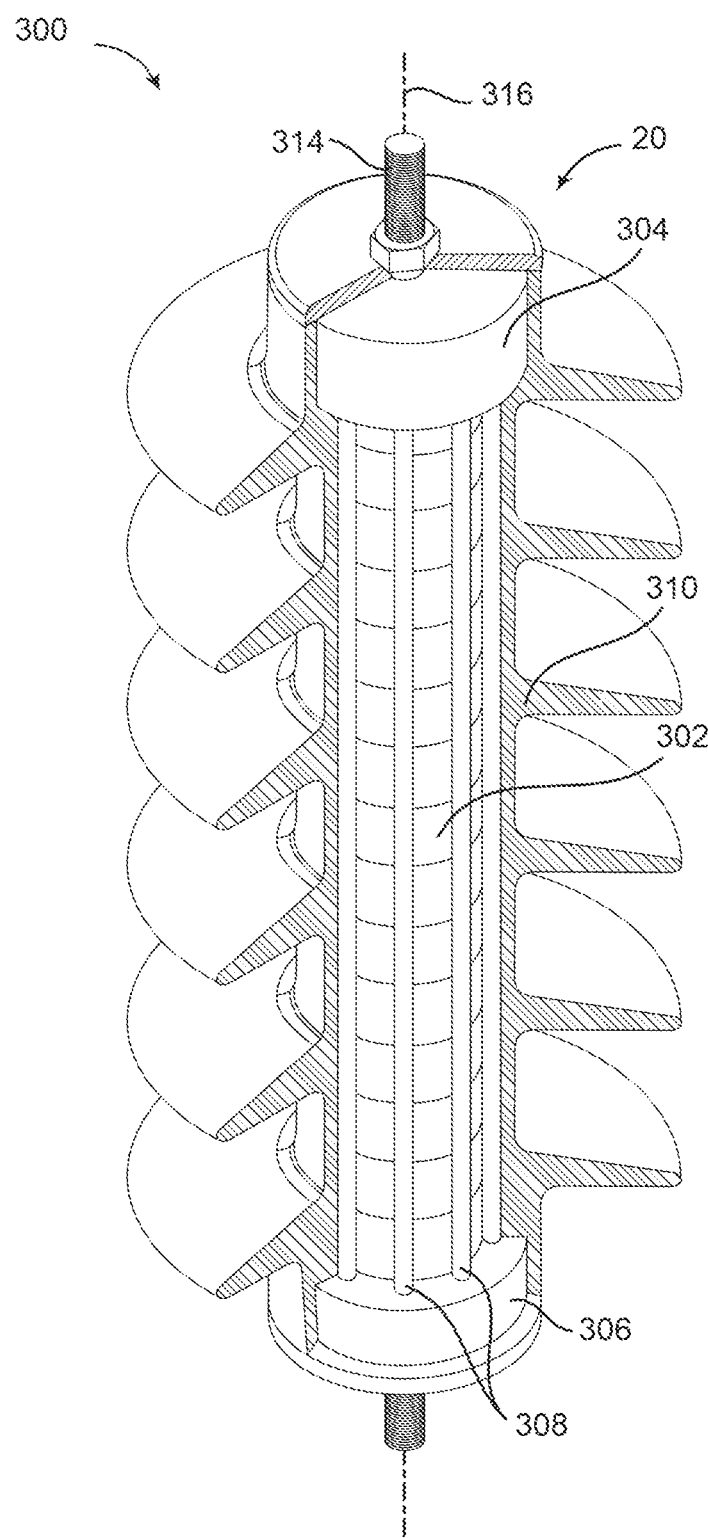
FIG. 3 illustrates a cut away view of a prior art composite cage type polymer arrester assembly used in the power system industry.

FIG. 3 illustrates yet another conventional polymer housed composite surge arrester subassembly 300 using a composite cage construction. With this concept, MOV blocks 302 are clamped between end terminals 304, 306 containing an array of pultruded fiberglass rods 308 which are swaged in place creating a cage structure which is encapsulated by polymer housing 310 creating an arrester subassembly 312. A central threaded rod 314 fastens the components together along an axis 316.

Figure 4:
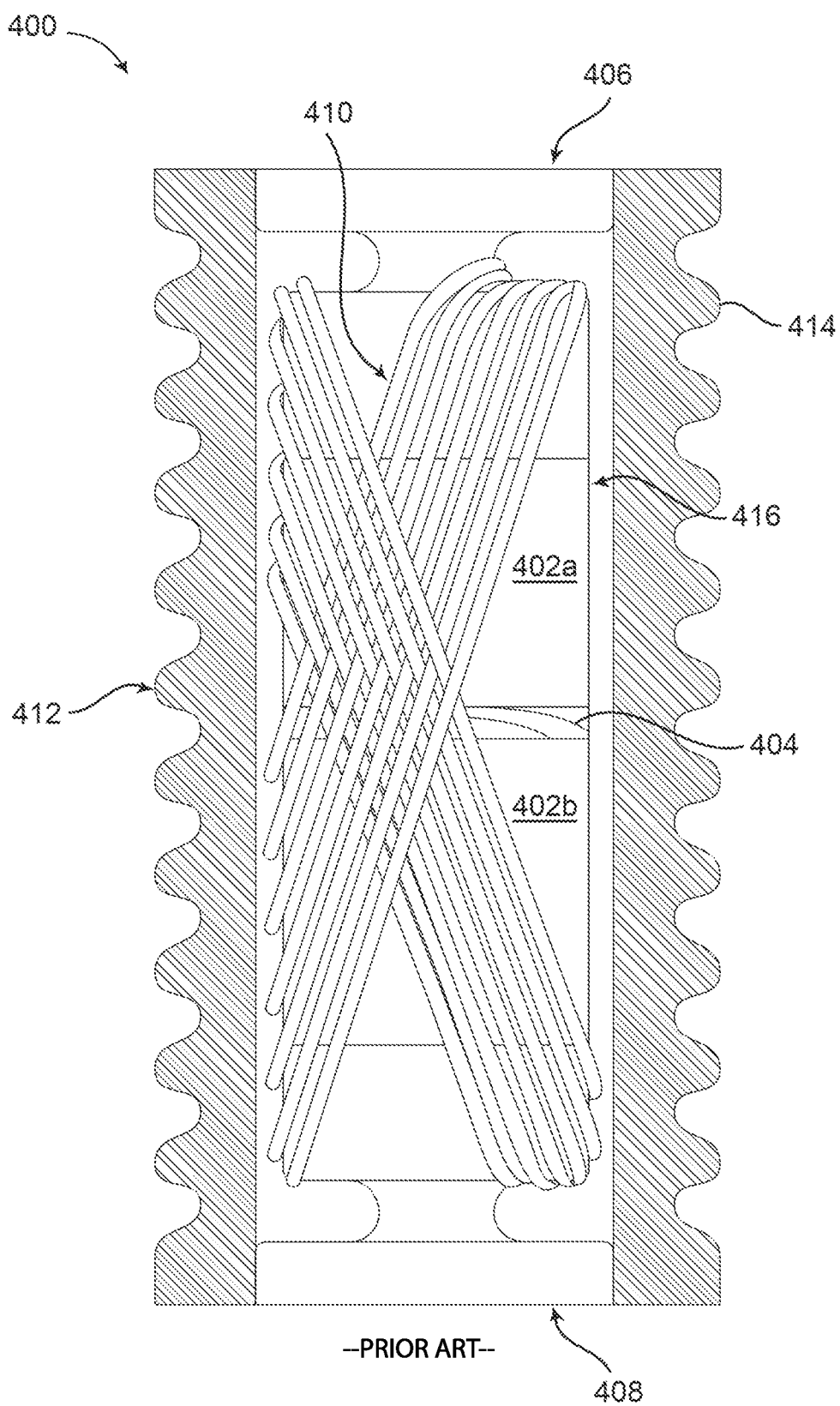
FIG. 4 illustrates a cross-sectional view of a prior art composite filament wound type polymer housed composite arrester module assembly used in the power system industry.

FIG. 4 references another conventional polymer housed composite surge arrester module 400 using a filament winding construction. MOV Blocks 402a, 402b having spring washer 404 between them are clamped between end terminals 406, 408 and wrapped with epoxy impregnated fiber tows 410 and cured to create a structural module 416 which is inserted into polymer housing 412 creating arrester module 414.

By contrast, as discussed in more detail below, presently preferred embodiments of a composite arrester module in accordance with the present invention differ in several material respects. To elaborate in more detail, a presently preferred embodiment of a composite arrester module incorporating various advantageous features of various embodiments of the invention is depicted in FIGS. 5-18B.

Figure 5:
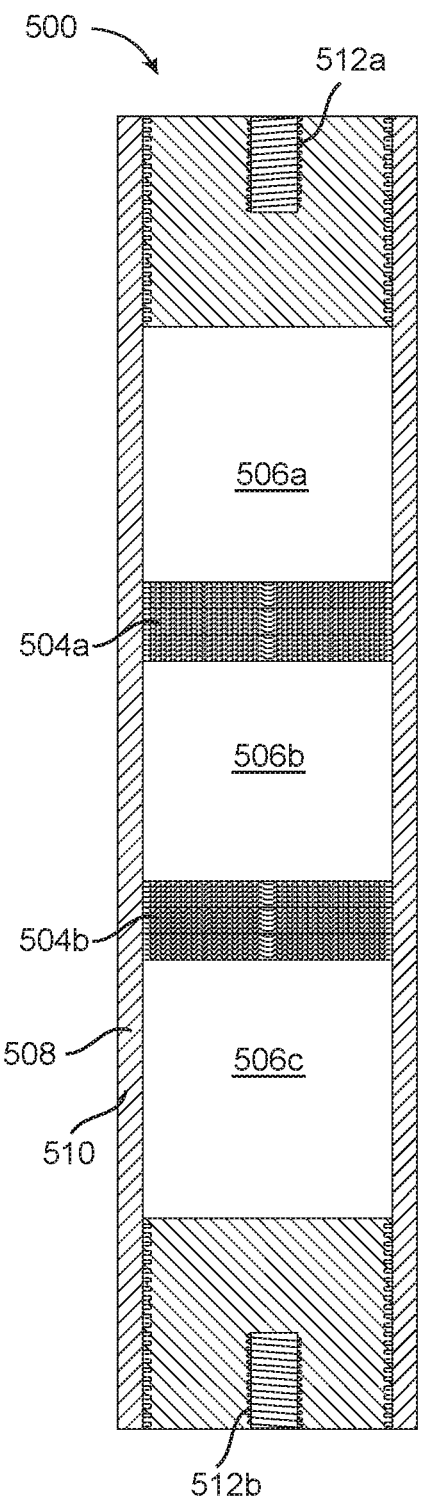
FIG. 5 illustrates a sectioned side view of an exemplary arrester module array for a composite surge arrester assembly, in accordance with an embodiment of the present invention.
Figure 6:
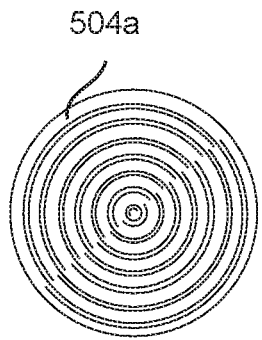
FIG. 6 illustrates a top view of an exemplary deformable conductive contact plate, in accordance with an embodiment of the present invention.
Figure 7:
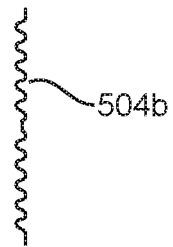
FIG. 7 illustrates an elevated side view of the deformable conductive contact plate shown in FIG. 6, in accordance with an embodiment of the present invention.
Figure 8:
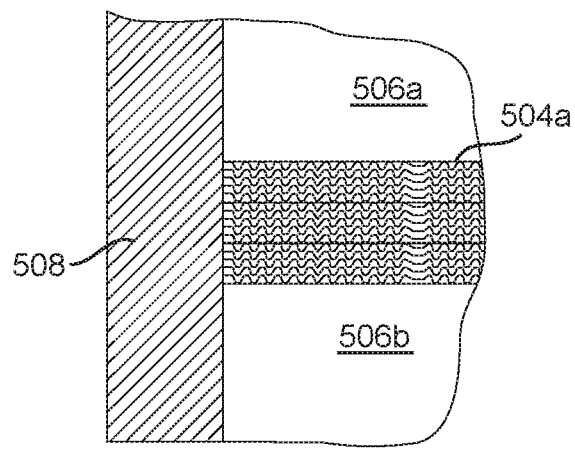
FIG. 8 illustrates an enlarged cross-sectional view of an embodiment of the deformable conductive contact plate applied in an arrester array, in accordance with an embodiment of the present invention.

As referenced in FIG. 5, the surge arrester module 500 comprises an arrester array 502 having an alternating arrangement of conductive contact plates 504a, 504b, and MOV blocks 506a, 506b, 506c. In one non-limiting embodiment, a pair of terminals 512a, 512b are disposed to cap the ends of the arrester array 502. The conductive contact plates 504a-b, the MOV blocks 506a-c, and the terminals 512a-b are disposed axially in series to form a continuous conduction path. As discussed above, normal operation carries electrical current from a power source to the electronic device. However, the MOV blocks 506a-c decreases in impedance during a voltage surge, which diverts the current from the conduction path to ground.

As shown, the deformable conductive contact plates comprise several deformable conductive contact plates 504a-b that enable electrical conduction between MOV blocks 506a-c. In one non-limiting embodiment, the conductive contact plate 504a is a thin plate of metal, as shown in the top and side views of FIGS. 6 and 7. The conductive contact plates 504a-b are malleable, and easily deformed to make uniform contact with the MOV blocks 506a-c. This deformability is also possible when compression forces in the range of 200-1200 pounds are applied on the arrester array 502.

In one non-limiting embodiment, the conductive contact plates 504a-b are defined by a separation distance of approximately at least 3/8". The conductive contact plates 504a-b are operatively arranged to provide low impedance electrical contact with an applied force between 50-1200 pounds. In one non-limiting embodiment illustrated in FIG. 8, the deformable conductive contact plates 504a-b are defined by a height of at least 20% of a height of the MOV blocks. These unique dimensions help to reduce metal mass and create optimal electrical conductivity in the arrester array 502.

Figure 9:
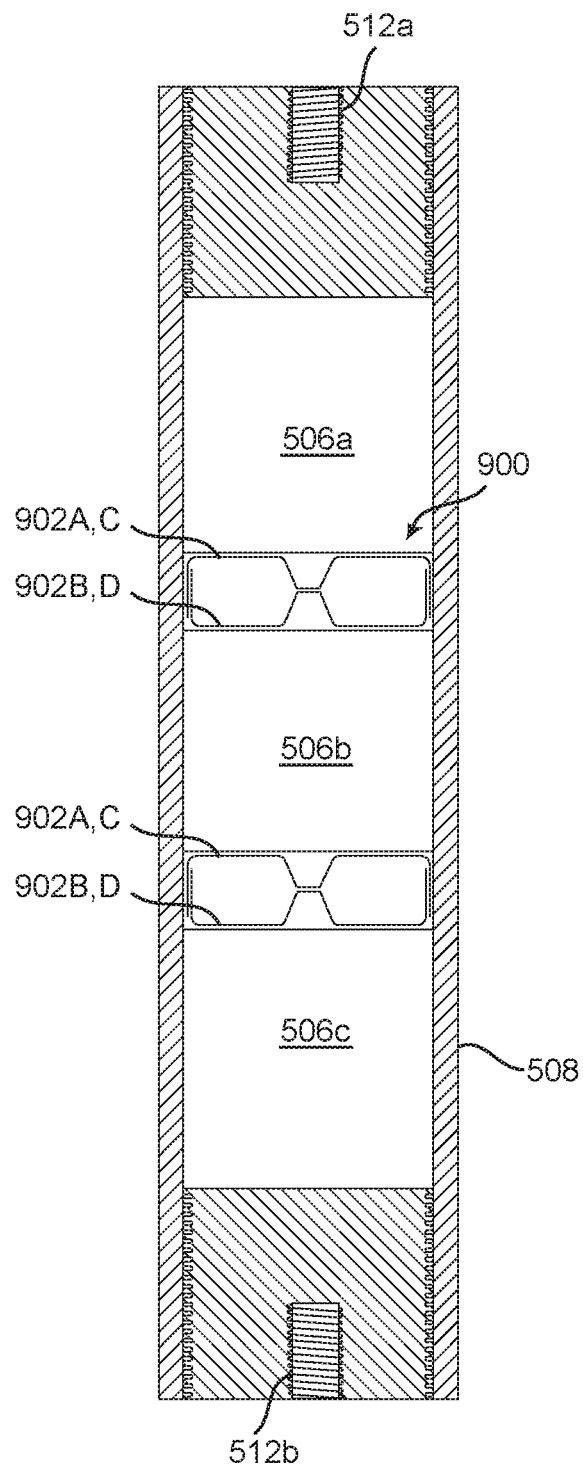
FIG. 9 illustrates a sectioned side view of an alternative embodiment of the arrester module array, showing deformable nesting contact spacers defined by two spaced-apart metal plates, in accordance with an embodiment of the present invention.

FIG. 9 illustrates a sectioned side view of an alternative embodiment of the arrester array, showing deformable nesting contact spacers 900 defined by two spaced-apart metal plates 902a, b and 902 c,d. Looking now at FIGS. 10, 11, 12, and 13, each of the deformable conductive contact plates 902a,b,c,d may be defined by variously shaped and configured plates that deform to create uniform contact points with the MOV blocks 506a-c, and also restrict epoxy resin bleed from the reinforcing member, as described below. Suitable shapes for the conductive contact plate surfaces may include, without limitation, convex shapes, radial ridges 1000, spoked and radial ridges 1100, spoked ridges 1200, substantially smooth contact surfaces 1300, and completely smooth contact surfaces. Though in other embodiments, other shapes may be used.

Figure 10:
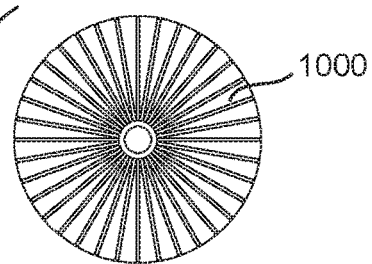
FIG. 10 illustrates a bottom view of a metal plate from the deformable nesting contact spacers having radial ridges, in accordance with an embodiment of the present invention.
Figure 11:
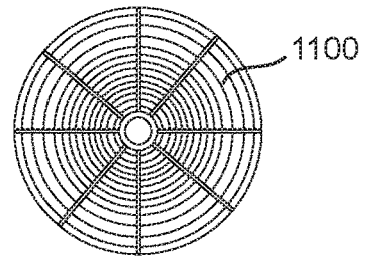
FIG. 11 illustrates a bottom view of a metal plate from the deformable nesting contact spacers having spoked and radial ridges, in accordance with an embodiment of the present invention.
Figure 12:
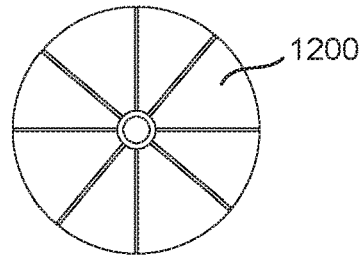
FIG. 12 illustrates a bottom view of a metal plate from the deformable nesting contact spacers having spoked ridges, in accordance with an embodiment of the present invention.
Figure 13:
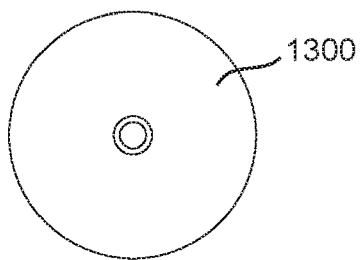
FIG. 13 illustrates a bottom view of a metal plate from the deformable nesting contact spacers having smooth contact surfaces, in accordance with an embodiment of the present invention.

For example, FIG. 10 illustrates a bottom view of a metal plate from the deformable nesting contact spacers having radial ridges 1000. FIG. 11 illustrates a bottom view of a metal plate from the deformable nesting contact spacers having spoked and radial ridges 1100. FIG. 12 illustrates a bottom view of a metal plate from the deformable nesting contact spacers having spoked ridges 1200. And FIG. 13 illustrates a bottom view of a metal plate from the deformable nesting contact spacers having smooth contact surfaces 1300. Further embodiments may also include a convex surface, and combinations of the aforementioned surfaces.

While not readily apparent in these views, deformable conductive contact plates 504a-b could also be convex with respect to the MOV block contact surface such that the conformable plate deflects to make uniform contact when compression force contained by the composite structure on the array of MOV blocks 5061-c, end electrodes, and deformable conductive contact plates 504a-b is in the preferred range of 200-1200 pounds.

Within the stack of conductive contact plates 504a-b, many alternate surface profiles could be utilized including some portion of plates being smooth surfaced. It is preferred that the contact plates be made of a highly conductive metal in the fully annealed state so as to allow for bending to create uniform contact across the MOV block contact face. Although alternate conductive materials can be used, aluminum is a preferred material as it is also typically deposited in arc spray form on MOV block contact faces. Using the same base material throughout the contact points eliminates concern of potential compatibility issues within the conduction path.

In one non-limiting embodiment, MOV blocks 506a-c alternate between a high impedance and a low impedance based on presence of high current impulses. MOV blocks 506a-c are operatively arranged at an applied force greater than 200 pounds, or in other embodiments, between 50-1200 pounds. In one non-limiting embodiment, MOV blocks 506a-c are defined by a thickness to diameter ratio between 0.6 and 1.1. This ratio, along with the thickness of the MOV blocks and conductive contact plates, allows the assembly to reduce the mass of MOV block and conduction path components by more than 5%. The diameter and mass of MOV blocks as well as volume of conductive metal spacer material is reduced.

To elaborate, spacing of the MOV blocks 506a-c using the stack of conductive contact plates creating a conformable spacer array resulting in a spacing of at least approximately 0.375" combined with the composite body structure surrounding said joint area having off axis fiber glass reinforcement provides a relaxable feature for means to dampen the acoustic shock wave which results from high current impulses while maintaining electrical contact between MOV blocks 506a-c.

While for life reliability reasons the composite layer is most preferably bonded to said array of MOV, end electrode and contact plate components, use of a nonbonded live interface can also be configured to create an optimized relaxable feature within the composite and polymers beneficial with respect to dampening of said acoustic shock wave. Through use of these concepts and also maintaining more optimum MOV block thickness to height ratios, the present inventor was also able to reduce the diameter and mass of MOV blocks 506a-c as well as volume of conductive metal spacer material, and insulating composite structural material, and insulating polymer housing material required per unit voltage rating of the completed medium voltage polymer housed composite arrester.

Figure 17A:
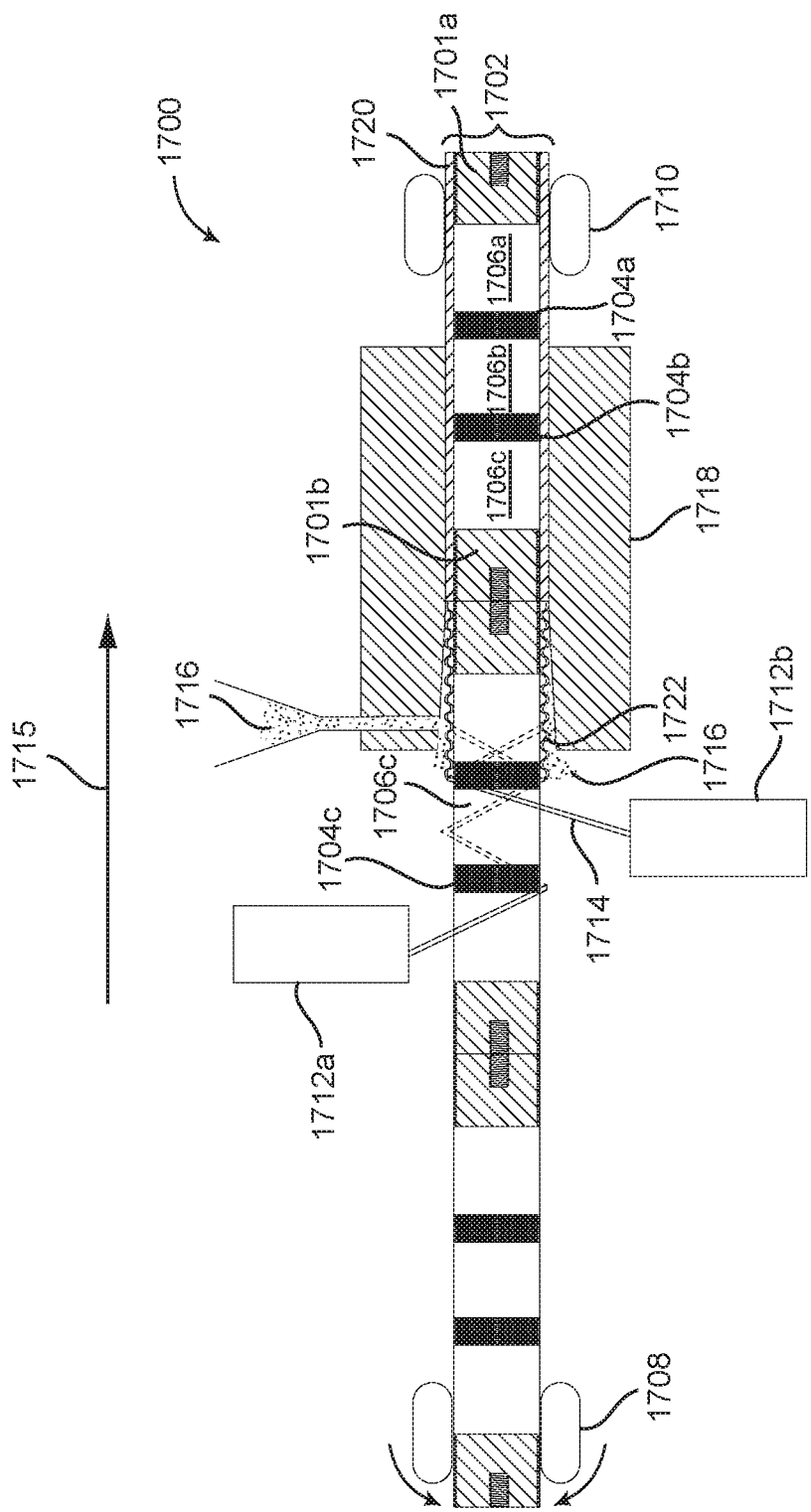
FIGS. 17A and 17B illustrates a process for constructing a composite surge arrester assembly, showing epoxy impregnated fiberglass reinforcement structure winding around an arrester array while passing through a die, where

Looking now at FIG. 17A, an epoxy impregnated fiberglass reinforcement member winds around the arrester array. This reinforcing member can be optimized to both provide adequate mechanical structure and to create the relaxable feature which acts to dampen acoustic shock waves resulting from high current impulses. The reinforcement member may be formed using filament wound, circumferential wound glass fibers, or oriented glass fiber fabric in an epoxy matrix. In one non-limiting embodiment, the reinforcement member comprises an epoxy impregnated biaxial fiber glass fabric that is wrapped or wound around an epoxy impregnated fiberglass composite.

The reinforcement member is disposed in a spiraling or back and forth configuration at an angle relative to the axial disposition of the arrester array. The angle of the epoxy impregnated fiberglass reinforcement member relative to the arrester array may be between 0° to 90°. However other embodiments, the angle is 45°, or between 30° to 60°.

It is also significant to note that while the reinforcement member is wound around the arrester array, air channels are purged from between the epoxy and fiberglass reinforced arrester array. The fiberglass and epoxy reinforced arrester array is pushed into or through a clearance fit curing die, such that as the excess resin is displaced, entrapped air and capillaries between the reinforcement member and the arrester array also flow out with the excess resin. The epoxy resins that impregnate the fiberglass reinforcement member force the extra air out. The epoxy and fiberglass reinforcing structure on the arrester array aid in dampening of the acoustic shock waves resulting from high current impulses.

Figure 14:
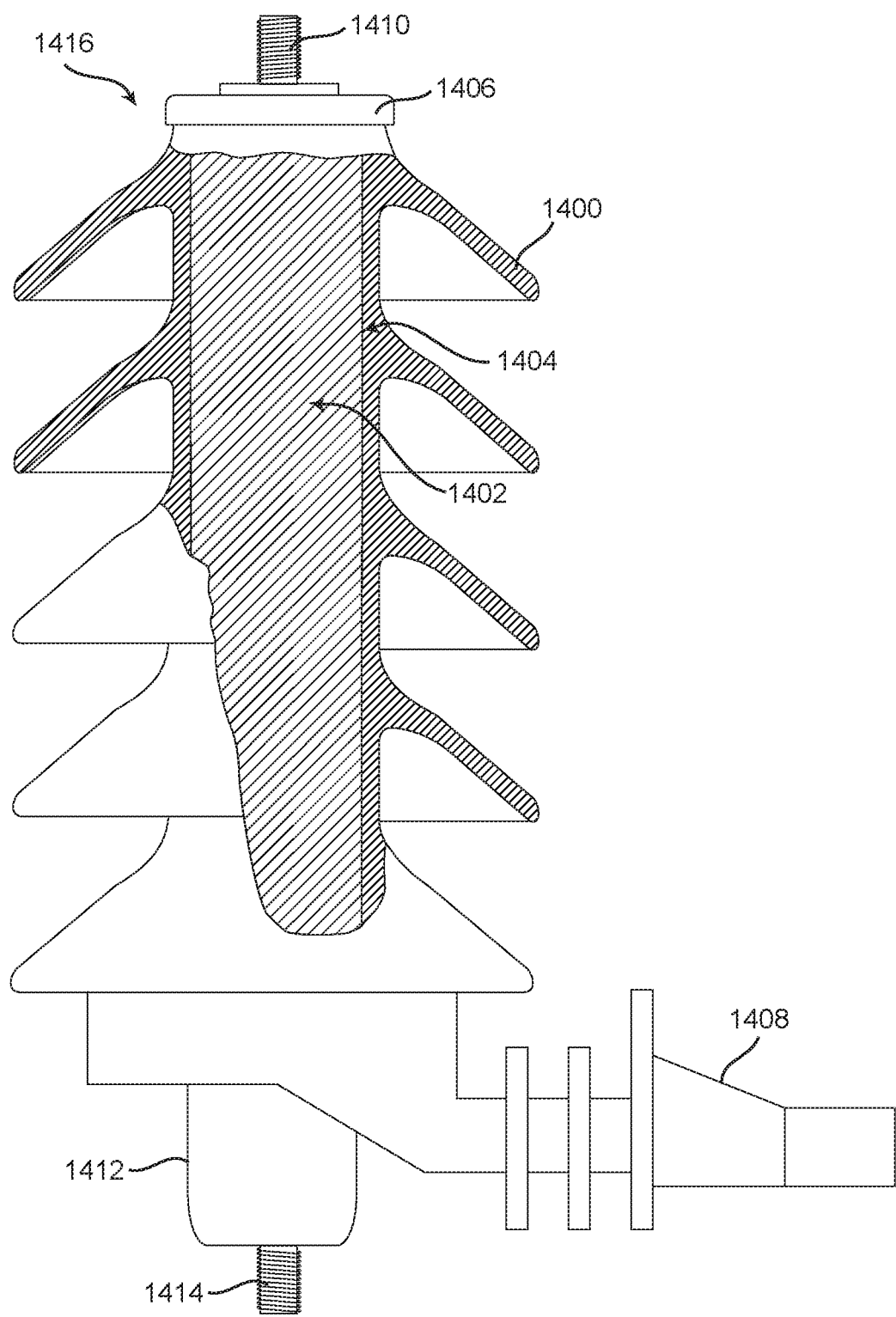
FIG. 14 illustrates a cut away view of a composite surge arrester assembly with a polymer housing, in accordance with an embodiment of the present invention.

As FIG. 14 illustrates, the assembly further comprises a polymer housing 1400 that encases the fiberglass and epoxy enforced arrester array 1402. In one embodiment, the encasing polymer housing 1400 comprises an insulating polymer material. In one non-limiting embodiment, housing 1400 is contained on each end by cover plate 1406 and insulating bracket 1408, being fastened in place by top stud 1410. Housing 1400 may further include a ground lead disconnector 1412 and bottom electrode, resulting in typical completed medium voltage polymer housed composite arrester assembly 1416.

Polymer housing 1400 is dilated over the composite reinforced arrester module. This may serve to create a hermetically sealed assembly. In some embodiments, housing 1400 is dilated by at least approximately 10% in diameter as this interference fit in combination with a weak bond created between the arrester array and the epoxy impregnated fiberglass reinforcement member. This bond is created due to an adhesive 1404, such as a bonding agent or silane treated room temperature vulcanizing silicone.

Figure 15:
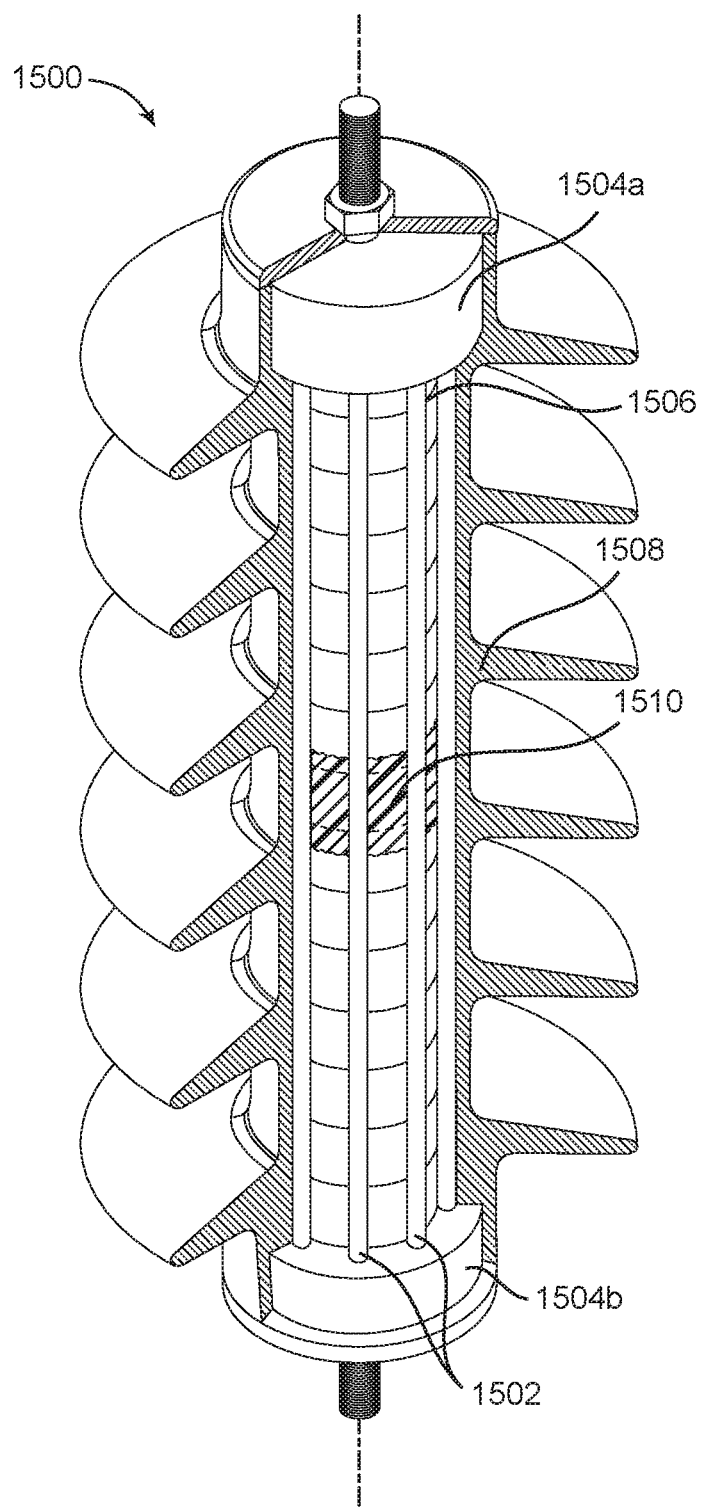
FIG. 15 illustrates a cut away view of an alternative embodiment of the composite surge assembly, showing a cage type surge arrester, in accordance with an embodiment of the present invention.

In some embodiments, an adhesive 1404 (coupling agent) helps bond the polymer housing 1400 to the fiberglass and epoxy reinforced arrester array 1402. In one non-limiting embodiment, the adhesive 1404 comprises a silane treated room temperature vulcanizing silicone that is used to bond the polymer housing 1400 to the fiberglass and epoxy reinforced arrester array 1402. In some embodiments, the material composition of the polymer may include, without limitation, a relaxable insulating polymer, fiberglass epoxy composite fiber glass epoxy combined with a polymer, and a polymer encasement FIG. 15 illustrates a cut away view of an alternative embodiment of a composite surge assembly, showing a cage type surge arrester 1500. In this configuration at least one composite rod 1502 extends between the end electrodes 1504a, 1504b. MOV blocks 1506 are clamped between end electrodes 1504a-b containing an array of pultruded fiberglass rods 1502 which are swaged in place creating a cage structure which is encapsulated by polymer housing 1508 creating cage type surge arrester 1500. An insulating polymer material 1510 is disposed between the composite rod 1502 and the MOV blocks 1506. The insulating polymer material 1510 causes the rods 1502 to be deflected near the center of the arrester array with an elastic insulating polymer, so as to create a relaxable feature.

Thus, prior art composite arrester modules utilizing cage construction as presented in FIG. 3 can also be reconfigured to contain embodiments of this invention. For example, conformal spacers or stacks of conformal contact plates can be utilized. Prior to swaging of the end electrodes, conformable elastomeric materials 1510 could be placed between cage pultrusions (rods) and MOV blocks 1506 or spacers approximately centered between end electrodes 1504a-b so as to deflect said pultrusions outward from their axis within the end electrodes 1504a-b. These are all encapsulated by the insulating polymer housing material, which combines the effects of the conformable spacers or conformal contact plate stacks, the pultruded rods, and elastomeric spacing material. The resultant is that the cage type surge arrester 1500 exhibits a relaxable feature, which can be tailored to dampen acoustic shock waves produced by lightning impulse duty.

Figure 16:
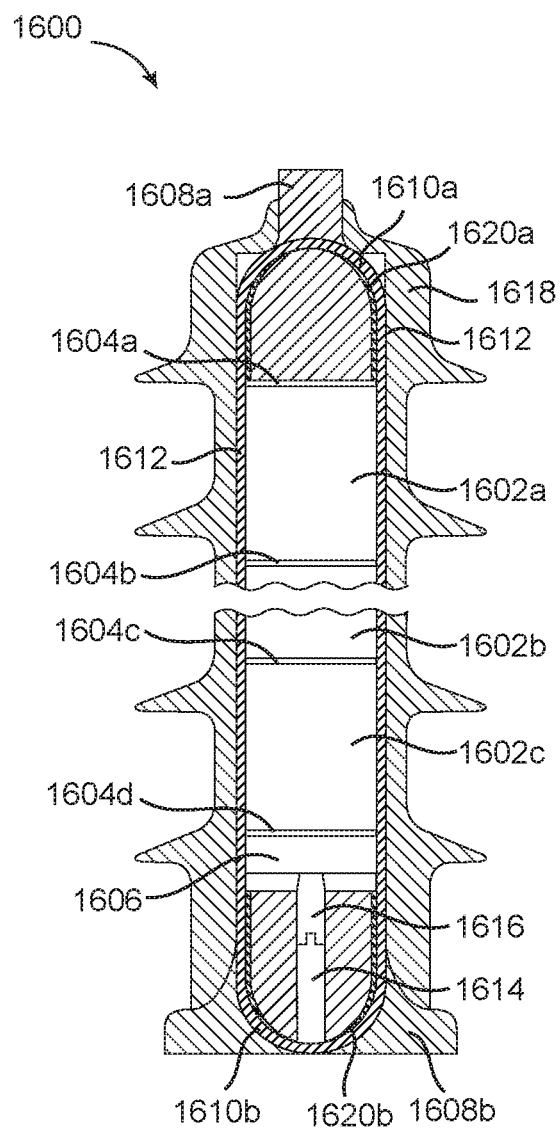
FIG. 16 illustrates a cross-sectional view of an alternative embodiment of the composite surge arrester module assembly, showing a hoop type surge module construction, in accordance with an embodiment of the present invention.

FIG. 16 illustrates a cross-sectional view of an alternative embodiment of a composite surge assembly, showing a hoop type surge arrester 1600. In one non-limiting embodiment of the hoop type surge arrester 1600, MOV blocks 1602a, 1602b, 1602c having conformal spacers or contact plate stacks 1604a, 1604b, 1604c arranged between, and conductive spacer 1606 on one end are contained between end electrodes 1608a, 1608b. End electrodes 1608a-b contain embossments 1610a, 1610b that are 180° apart on each end electrode 1608a-b.

At least one hoop 1612 is arranged on each pair of embossments 1610a-b. In one non-limiting embodiment, an insulating polymer material 1620 is disposed between the hoops 1612 and the embossments 1610a-b. In another embodiment, a relaxed polymer material is incorporated between embossments having a smaller radius than a bearing ends of hoops so as to fill the gap between the hoops and embossments with the insulating polymer material.

In one non-limiting embodiment, hoop 1612 comprises a concentric composite hoop or an off axis composite hoop. End electrode 1608b contains threaded bore 1614 in which treaded tensioning stud 1616 is located. Tensioning stud 1616 is screwed into threaded bore 1614 against spacer 1606 placing all contained components 1602a-c, 1604a-c, 1606 in compression and in electrical contact with end electrodes 1608a-b which is all contained in polymer housing 1618 creating a hoop type surge arrester 1600.

Thus, if embossments 1610a-b relative to hoops 1612 are reshaped to have smaller end radius so as to create an unsupported area on each end of hoops 1612, an unsupported hoop area is created which can be filled with an elastic insulating polymer thus creating a relaxable feature within the composite reinforcement. Further, by replacing prior art contact plates with deformable conductive contact plate stacks 504a-b, or a pair of deformable nesting contact spacers 900, adequate spacing can be created for the relaxable feature conditions to diffuse the acoustic shock wave resulting from high current impulse. Additionally, within this composite arrester module design, hoops 1612 are separated from MOV blocks 1602a-c.

After the hoop type surge arrester 1600 is assembled, the composite model is preloaded using jack screw in threaded bore creating preferred preload in the range of 250-1,250 pounds. Typically, all radial surfaces of stack components are surface treated with an adhesive or coupling agent, then the polymeric insulating housing is applied to encapsulate said composite arrester module, filling all internal gaps or spaces with said insulating polymer material thus providing an elastomeric supporting material between said embossments 1610a-b and hoops 1612, thereby creating said relaxable feature to provide acoustic shock wave dampening means.

FIG. 17A illustrates a process for constructing a composite surge arrester assembly 1700. As shown, an arrester array 1702 is fully assembled, comprising end electrodes 1701a, 1701b, an alternating arrangement of conductive contact plates 1704a, 1704b, and MOV blocks 1706a, 1706b, 1706c. Arrester array 1702 passes through a die, and is contained in compression by traction drive 1708 which pushes the arrester array 1702 through the die while drag resistance within the curing die and optional or supplemental restricting drive 1710 provides frictional resistance to create a force across the arrester array 1702 in the end to end array in the range of 200 to 1,200 pounds; and most preferably of about 400 lbs.

As the arrester arrays progress through the process in direction 1715, a glass-fiber/epoxy reinforcing structure 1714 is wound around the arrester 1702 array while under an axially compressive load of 200-1200 pounds and having fibers oriented at range of angles between ±30° to ±60° relative to the axis of arrester array 1702. Specifically, circumferential winding spools 1712a, 1712b apply tows of glass filaments 1714 circumferentially on the component stacks at angles with respect to the traveling axis in the range of ±30° to ±60°; and most preferably at about ±45°. The angle is maintained by controlling the relative speed of drives 1708 and circumferential winding spools 1712a-b.

In some embodiments, the tows of filaments 1714 can be of the prepreg type containing epoxy resin, or they may be wetted with epoxy resin 1716 as the composite arrester modules enter curing die 1718. With either type of epoxy impregnation, excess epoxy and entrapped air flow out of the tapered end of curing die 1718. In the case of wet epoxy resin impregnation type, resin 1716 is injected through the entry area of the die or dripped over the arrester array before the die. Excess epoxy resin 1716 and any entrapped air flow out of the tapered end of the die as the arrester array enters and is radially compressed. It is also practical to recycle the excess resin into the application area after some settling time allowing entrained air bubbles to separate from the epoxy resin.

The die may include a curing die of a flexible interface fit type, or a rigid clearance fit type. In either case, there is a relatively open entry end progressing toward a constricting section that applies radial pressure on the fibers and epoxy compacting the composite array against the arrester array. In this way, substantially all air is effectively removed from within the composite matrix and composite to arrester array interface. This ensures dielectric strength is maximized for improved reliability both during steady state conditions and during lightning impulses or other types of overvoltage conditions.

In one non-limiting embodiment, the epoxy and fiberglass reinforced arrester array is pushed through or pushed into the curing die and compressed against the array. While being displaced in this manner, compression is applied to the surface of the reinforced arrester array within the curing die. Most manufacturers cure in air without any compression on the surface which results in air entrapment, resulting in a lower dielectric strength interface between the arrester array and composite as well as within the composite layer itself. Air and voids within the interface and composite materials resulting from these types of processes likely result in lower dielectric strength as well as increase the susceptibility for moisture ingress which can lead to carbon tracking and short circuit failure over time.

Individual composite arrester modules 1720 exit the process in a log form having a uniform and predominantly air free cured composite structure so as to contain the arrester array 1702 in a preferred hermetically sealed composite structure. Logs are then cut into individual modules 1720 using one of many common methods, for example by revolving a rolling cutter around the log at module to module transition points and breaking the modules apart.

Alternatively, the arrester array 1702 is not restricted to hermetically sealed and bonded interfaces between the epoxy impregnated filaments 1714 and the circumferential surfaces of the MOV blocks 1706*a-b* and conductive contact plates 1704*a-b*. For example, the spiraling configuration of filament forms gaps across the arrester array. In this manner, winding the epoxy impregnated filaments 1714 around the arrester array 1702 causes air and excess epoxy 1716 to be purged from between the epoxy impregnated filaments 1714 and the arrester array 1702. Although not as desirable, a live interface relative to the components can be attained using commonly known release agents in many forms such as liquid, paste, film, tape, rtv silicone, etc.

As will be obvious to those skilled in the art, many alternate embodiments covered under this invention exist within composite processing technologies to achieve equivalent end results. Composite surge arrester assembly 1700 could be produced using filament winding, composite tape winding, and other known composite methods. Even methods utilizing bulk or sheet molding compounds can be employed as embodiments. Utilizing these compounds, having more random oriented chopped or continuous fibers, the module could be formed and cured in a mold or in a process similar to described embodiments herein.

Figure 17B:
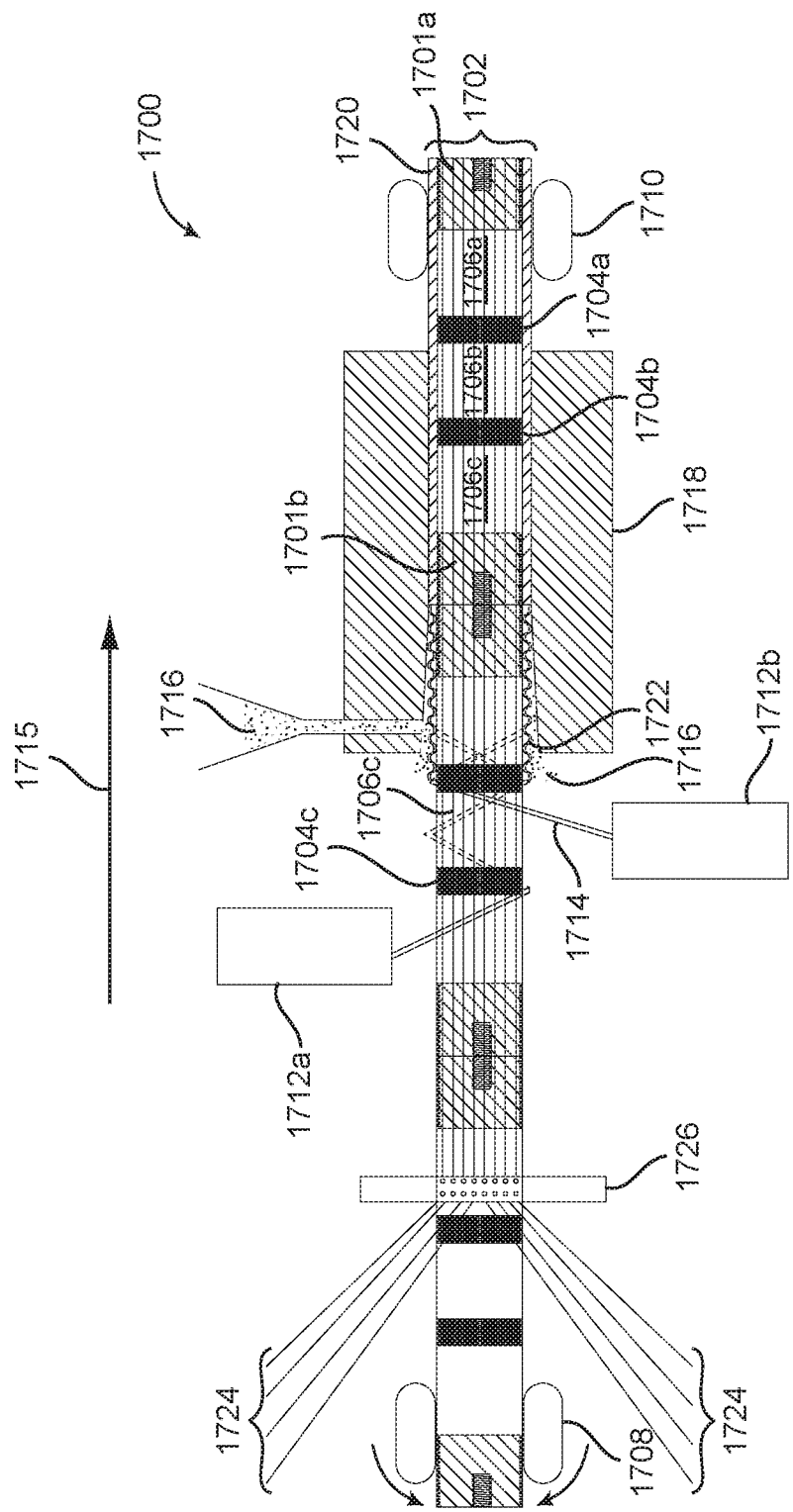

For example, in an alternative form of the process, FIG. 17B shows a process for constructing the composite surge arrester assembly 1700 with fiberglass reinforcement while the arrester array is pushed through or pushed into the die. In this configuration, the die comprises a collar 1726 containing spaced eyelets to control spacing of fiberglass tows 1724. The arrester array pulls fiberglass tows 1724 from bobbins or other containers while the arrester array is being pushed through die 1718.

The process methods demonstrated in FIGS. 17A and 17B can be used in a manor to optimize the acoustic shock wave absorbing relaxable feature in conjunction with the conformal contact spacers or can be used to produce very ridged high strength arrester arrays with or without the conformal spacers. In the latter configuration, these methods provide a very efficient way to achieve highly reliable dielectric strength and high mechanical strength even superior to that achieved in composite post insulators, due to the ceramic MOV block core.

Continuing on with a preferred process according to FIG. 17A, circumferential surfaces of composite reinforced arrester array 1702 are coated with a silane treated room temperature vulcanizing silicone compound coating 1722 (*rtv*), which is allowed to tack up or partially cure. Composite reinforced arrester array 1702 with partially cured rtv coating 1722 may then be inserted into a molded high temperature vulcanized silicone insulating housing, preferably of 60 to 70 durometer. It is significant to note that the use of silane treated room temperature vulcanizing silicone suits 2 purposes. It is a good coating to apply over the composite reinforced module to act as a corona suppressant, the rtv exists as a range of molecular weight silicone chains, the lighter chains being somewhat mobile coat all of the available surfaces and thereby increasing the dielectric strength. Primarily though, rtv is used in arrester designs having premolded silicone housings whereby it also bonds the premolded housing after it is stretched into place over the module. Alternatively, the circumferential surfaces of epoxy reinforced arrester module array 1702 are coated with a silane surface coating 1722, over which a high temperature vulcanized silicone insulating housing may be molded and bonded to said module.

Figure 18:
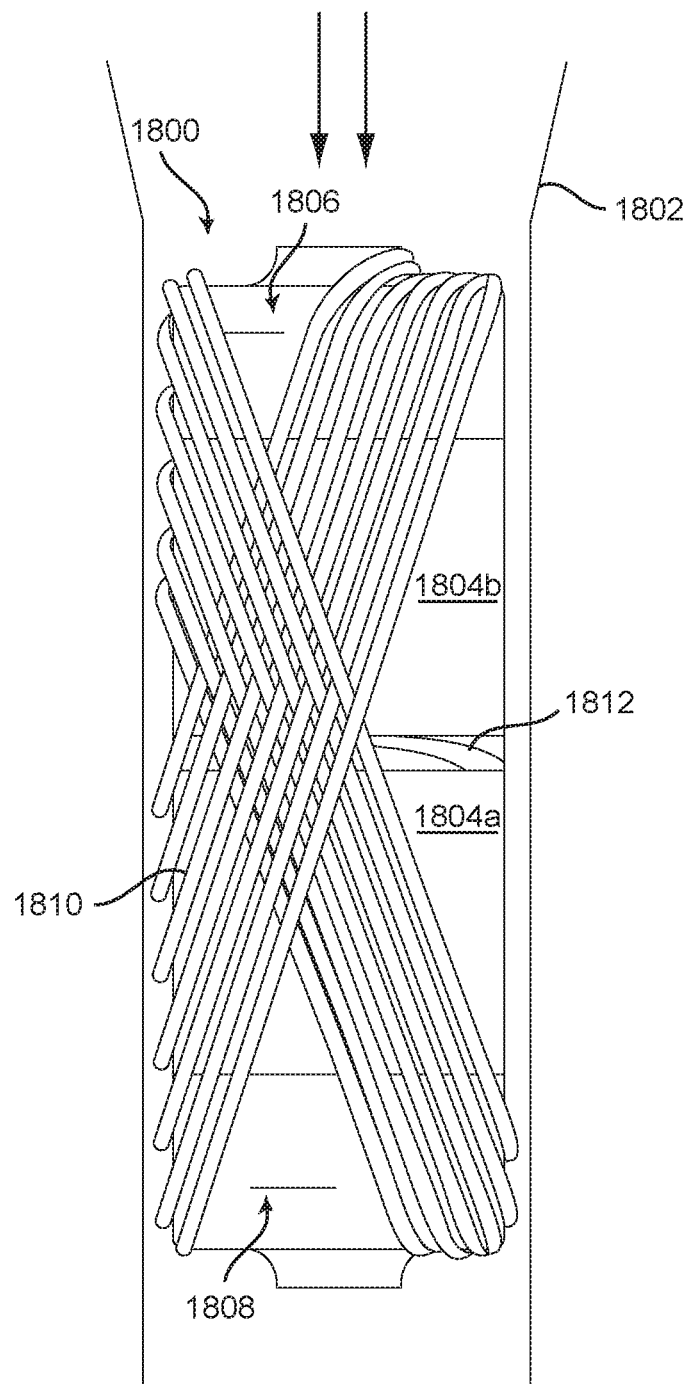
FIG. 18 illustrates a cross-sectional view of a composite filament wound type arrester module being pushed into a die cure, in accordance with an embodiment of the present invention.

FIG. 18 illustrates a cross-sectional view of a composite filament wound type arrester module 1800 being pushed into or through curing die 1802. The MOV blocks 1804*a*, 1804*b* are capped by end electrodes 1806, 1808, and are separated by a spring spacer 1812. The composite filament 1810 winds around the MOV blocks 1804 while the arrester array passes through or into the curing die 1802. The arrester array is compressed while being pushed through or into the curing die 1802. In one embodiment, the curing die 1802 comprises a flexible interface fit type, or a rigid clearance fit type.

As discussed in FIG. 14, housing 1400 is contained on each end by cover plate 1406 and insulating bracket 1408, being fastened in place by top terminal stud 1410 and, ground lead disconnector 1412 with bottom terminal stud 1414, resulting in completed medium voltage polymer housed composite arrester assembly 1700. Several configurations are common. For example, another cover plate 1406 and terminal stud 1410 may replace insulating bracket 1408 and ground lead disconnector 1412. The housing is dilated over the epoxy reinforced arrester array 1702 using additional of the rtv as lubricant. In one embodiment, housing 1400 is dilated by at least approximately 10% in diameter as this interference fit in combination with a weak bond created between the epoxy reinforced arrester array 1702 and are created due to the silane treated rtv coating.

By contrast, according to a preferred embodiment of the present invention, circumferential surfaces of epoxy reinforced arrester array 1702 are coated with a silane treatment having HTV silicone insulating housing directly molded upon and bonded to composite module. Alternately, said coating could be of a silicone grease lubricant and said housing could be a lower permeability polymer insulating compound for example, ethylene propylene diene monomer rubber (EPDM).

In yet another process for constructing a composite surge arrester assembly, FIG. 18 illustrates a cross-sectional view of a composite filament wound type arrester module being pushed into or through a die cure.

Figure 19A:
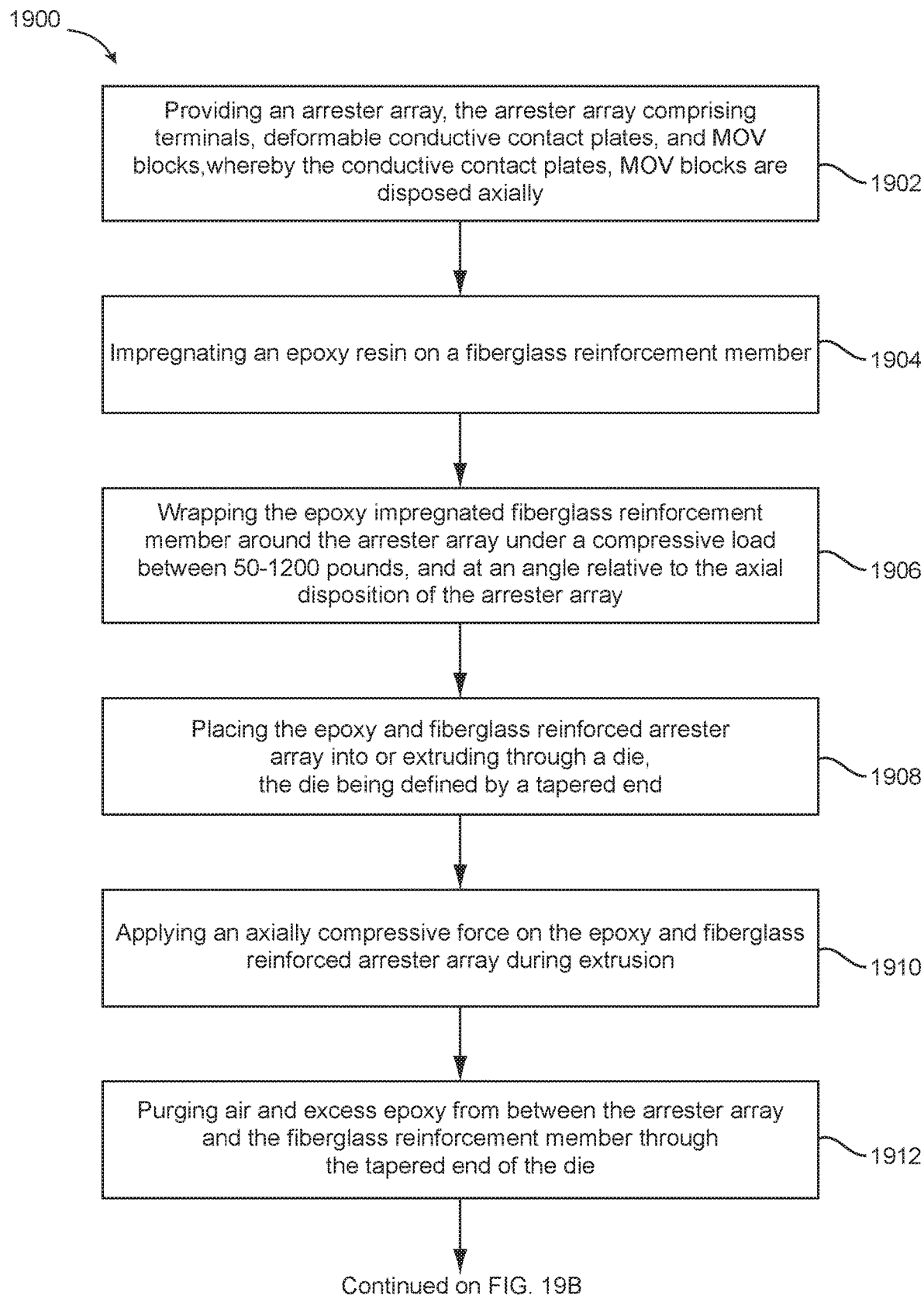
FIGS. 19A and 19B illustrate a flowchart of an exemplary method for constructing a composite surge arrester assembly, in accordance with an embodiment of the present invention.
Figure 19B:
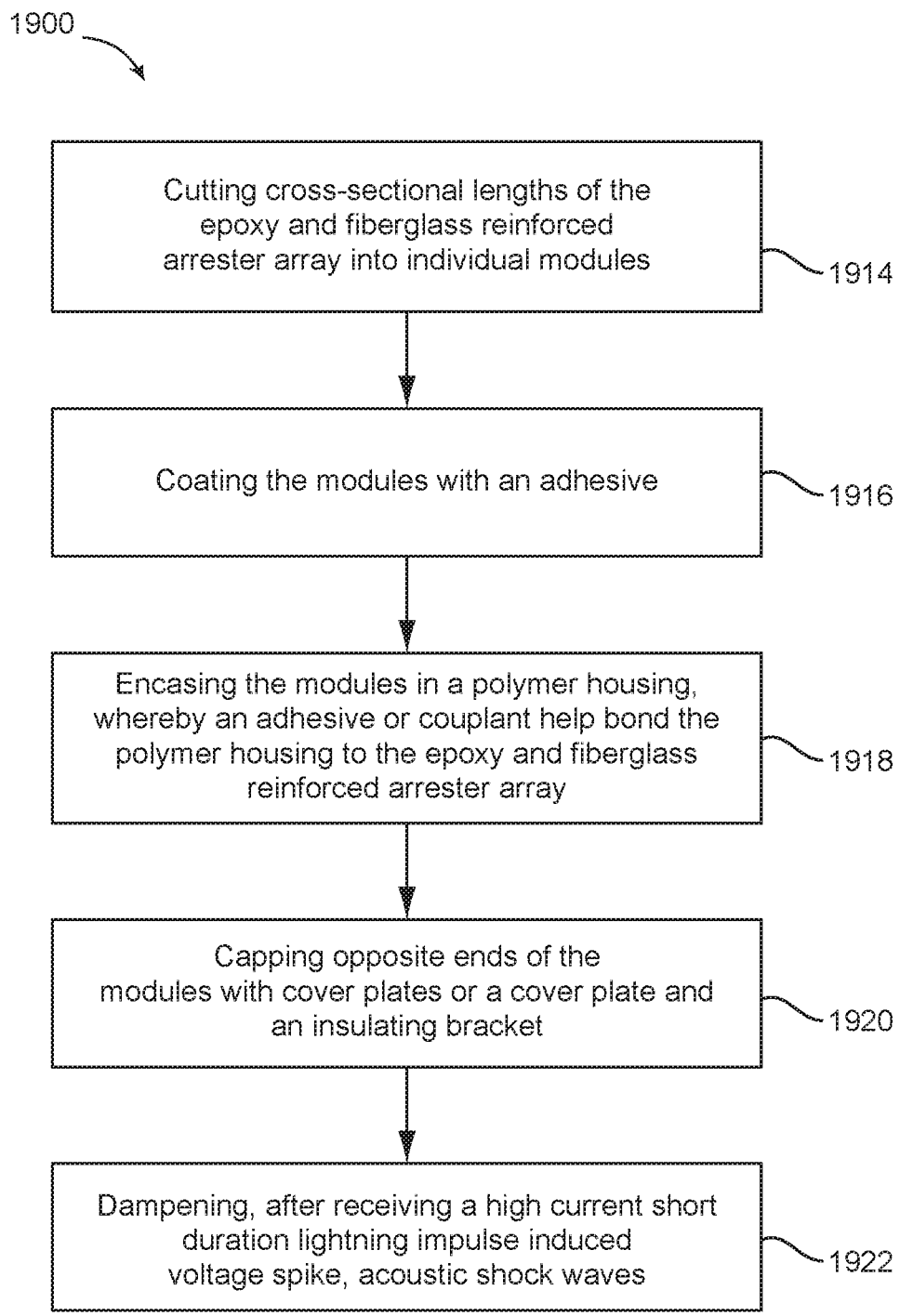

FIGS. 19A and 19B illustrate a flowchart diagram of an exemplary method 1900 of producing a composite surge arrester assembly. The method 1900 may include an initial Step 1902 of providing an arrester array, the arrester array comprising a pair of electrodes, a plurality of deformable conductive contact plates, and a plurality of metal oxide varistor blocks, whereby the conductive contact plates, and metal oxide varistor blocks are disposed axially in an alternating arrangement to form a continuous conduction path.

A Step 1904 comprises impregnating an epoxy resin on a fiberglass reinforcement member. The method 1900 may further comprise a Step 1906 includes wrapping the epoxy impregnated fiberglass reinforcement member around the arrester array in a spiraling configuration under a compressive load between 50-1200 pounds, the spiraling configuration of the reinforcement member being disposed at an angle relative to the axial disposition of the arrester array.

In some embodiments, a Step 1908 comprises placing the epoxy and fiberglass reinforced arrester array into or extruding through a die, the die being defined by a tapered end. While being displaced in this manner, compression is applied to the surface of the reinforced arrester array during the die curing process. Most manufacturers cure in air without any compression on the surface which results in air entrapment. A Step 1910 includes applying an axially compressive force on the epoxy and fiberglass reinforced arrester array during extrusion. The forces may be in the range between 200-1200 pounds.

Once again, as FIG. 19A shows, a Step 1912 may include purging air and excess epoxy from between the arrester array and the fiberglass reinforcement member through the tapered end of the die. A Step 1914 comprises cutting cross-sectional lengths of the epoxy and fiberglass reinforced arrester array into individual modules. A Step 1916 includes coating the modules with an adhesive or couplant, such as silane treated room temperature vulcanizing silicone.

A Step 1918 includes encasing the modules in a polymer housing, whereby the adhesive or couplant help bond the polymer housing to the epoxy and fiberglass reinforced arrester array. In some embodiments, a Step 1920 may include capping opposite ends of the modules with a cover plate and an insulating bracket. A final Step 1922 comprises dampening, after receiving a voltage spike, acoustic shock waves.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A composite surge arrester module, the module comprising:
    an arrester array having:
    a plurality of metal oxide varistor blocks disposed in an end to end array,
    a pair of electrodes being disposed at opposite ends of the arrester array,
    whereby the metal oxide varistor blocks and the electrodes are disposed axially in series to form a continuous conduction path;
    a die comprising a tapered end;
    an epoxy impregnated fiberglass reinforcement member disposed to wind or wrap around the arrester array in a configuration, the configuration of the reinforcement member being disposed at one or more angles between 0 degrees to 90 degrees relative to the axial disposition of the arrester array,
    whereby winding or wrapping the reinforcement member around the arrester array causes air and excess epoxy to be purged from between the reinforcement member and the arrester array,
    whereby the epoxy and fiberglass reinforced arrester array is pushed through or pushed into the die,
    whereby the die compresses the epoxy and fiberglass reinforced arrester array against the surface of the arrester array,
    whereby air and excess epoxy are purged from between the arrester array and the epoxy impregnated fiberglass reinforcement member through the tapered end of the die;
    a polymer housing encasing the epoxy and fiberglass reinforced arrester array; and
    an adhesive or silane couplant coating the epoxy and fiberglass reinforced arrester array,
    the adhesive or silane couplant helping to bond the polymer housing to the composite reinforced arrester array.

2. The module of claim 1, wherein the epoxy and fiberglass reinforced arrester array pulls fiberglass tows from the collar eyelets while being pushed through or pushed into the die.

3. The module of claim 1, wherein the configuration forms gaps across the arrester array.

4. The module of claim 1, wherein the arrester array further comprises a plurality of
    conductive spacers.

5. The module of claim 1, wherein the die comprises a flexible interface fit type, or a rigid clearance fit type.

6. A method of producing a composite surge arrester assembly, the method comprising:
    providing an arrester array, the arrester array comprising a pair of electrodes, a plurality of deformable conductive contact plates, and a plurality of metal oxide varistor blocks,
    whereby the conductive contact plates, and metal oxide varistor blocks are disposed axially in an alternating arrangement to form a continuous conduction path;
    impregnating an epoxy resin on a fiberglass reinforcement member;
    wrapping the epoxy impregnated fiberglass reinforcement member around the arrester array in a spiraling configuration under a compressive load between 50-1200 pounds, the spiraling configuration of the reinforcement member being disposed at an angle relative to the axial disposition of the arrester array;
    extruding the epoxy and fiberglass reinforced arrester array through a die, the die being defined by a tapered end;
    applying a compressive force on the epoxy and fiberglass reinforced arrester array during extrusion;
    purging air and excess epoxy from between the arrester array and the fiberglass reinforcement member through the tapered end of the die;
    cutting cross-sectional lengths of the epoxy and fiberglass reinforced arrester array into individual modules;
    coating the modules with an adhesive or couplant;
    encasing the modules in a polymer housing, whereby the adhesive or couplant help bond the polymer housing to the epoxy and fiberglass reinforced arrester array; and
    capping opposite ends of the modules with a cover plate and an insulating bracket.

7. The method of claim 6, wherein the angle of the spiraling reinforcement member in
    relation to the axial disposition of the arrester array is about between 0 degrees to 90 degrees.

8. The method of claim 6, wherein the angle of the spiraling reinforcement member in
    relation to the axial disposition of the arrester array is about 45 degrees.

9. The method of claim 6, wherein the die comprises a flexible interface fit type, or a rigid clearance fit type.

10. The method of claim 6, wherein the epoxy and fiberglass reinforced arrester array is
    pushed through or pushed into the die.

11. The method of claim 6, wherein the die comprises a collar containing eyelets and
    fiberglass tows.

12. The method of claim 11, further comprising a step of pushing the epoxy and fiberglass reinforced arrester array through the die.

13. The method of claim 12, further comprising a step of pulling, by the epoxy and
    fiberglass reinforced arrester array, fiberglass tows from the collar eyelets while being pushed through the die.

14. A method of producing a composite surge arrester assembly, the method comprising:
    providing an arrester module array, the arrester module array a plurality of metal oxide varistor blocks and a pair of end electrodes forming an axial, continuous conduction path;
    impregnating an epoxy resin on a fiberglass reinforcement member;
    wrapping the epoxy impregnated fiberglass reinforcement member around the arrester module array in a spiraling configuration under a compressive load between 50-1200 pounds, the spiraling configuration of the reinforcement member being disposed at one or more angles relative to the axial disposition of the arrester array;
    said arrester module array and spiraling reinforcement member entrapping and pulling fiberglass tows along from through a collar with eyelets which controls said fiber tow position relative to the circumference of the arrester module array;
    pushing the epoxy and fiberglass reinforced arrester array through a die, the die being defined by a tapered end;
    applying a compressive force on the epoxy and fiberglass reinforced arrester array during extrusion;
    purging air and excess epoxy from between the arrester array and the fiberglass reinforcement member through the tapered end of the die;
    pushing the epoxy and fiberglass reinforced arrester array through the die;
    pulling, by the epoxy and fiberglass reinforced arrester array, fiberglass tows from the collar eyelets while being pushed through the die;
    cutting cross-sectional lengths of the epoxy and fiberglass reinforced arrester array into individual modules;
    coating the modules with an adhesive or couplant;
    encasing the modules in a polymer housing, whereby the adhesive or couplant help bond the polymer housing to the epoxy and fiberglass reinforced arrester array; and
    capping opposite ends of the modules with a cover plate and an insulating bracket.

15. The method of claim 14, wherein the angle of the spiraling reinforcement member in
    relation to the axial disposition of the arrester array is about 45 degrees.

* * * * *